United States Patent [19]

Thereze

[11] Patent Number: 5,798,578
[45] Date of Patent: Aug. 25, 1998

[54] SYNCHRONIZATION DEVICE FOR A REDUNDANT POWER SUPPLY SYSTEM

[75] Inventor: Jean-Marie Thereze, Lannion, France

[73] Assignee: Alcatel Converters, Paris, France

[21] Appl. No.: 451,427

[22] Filed: May 26, 1995

[30] Foreign Application Priority Data

May 31, 1994 [FR] France ................................. 94 06604

[51] Int. Cl.$^6$ ..................................................... H02J 1/10
[52] U.S. Cl. ............................ 307/18; 307/31; 307/44; 307/23; 323/223
[58] Field of Search ............................. 307/11, 18, 19, 307/20, 23, 24, 25, 31, 32, 33, 43, 44, 52, 53, 85, 86; 323/311, 312, 223, 224

[56] References Cited

U.S. PATENT DOCUMENTS

| | | | |
|---|---|---|---|
| 4,724,502 | 2/1988 | Kawahira et al. | 361/62 |
| 5,045,712 | 9/1991 | Baggenstoss | 307/29 |
| 5,428,524 | 6/1995 | Massie | 363/79 |

FOREIGN PATENT DOCUMENTS

3332727A1  5/1984  Germany.

*Primary Examiner*—William M. Shoop, Jr.
*Assistant Examiner*—Jonathan Kaplan
*Attorney, Agent, or Firm*—Sughrue, Mion, Zinn, Macpeak & Seas, PLLC

[57] ABSTRACT

A synchronization device for a redundant power supply system synchronizes resetting of tripping type current limiter devices which are reset automatically, to prevent the current limiters tripping out in cascade when the system is started up or automatically reset after the disappearance of a short-term current surge. It includes a synchronization link interconnecting all the current limiters of all the power supply units. Each current limiter includes a generator sending a synchronization signal on the synchronization link periodically and independently for each current limiter. The generator which sends a synchronization signal first resets all the current limiters simultaneously. The device has applications in electronic equipment comprising a plurality of power supply units connected in parallel.

3 Claims, 3 Drawing Sheets

SYNCHRONIZATION DEVICE FOR A REDUNDANT POWER SUPPLY SYSTEM

BACKGROUND OF THE INVENTION

1. Field of the Invention

The invention concerns a synchronization device for a redundant power supply system supplying power to at least one load from a plurality of power supply units, each power supply unit including a tripping limiter device which is reset automatically and a coupling device for coupling at least two of the power supply units to each load. A system of this kind can be used in many types of electronic equipment such as a telephone central office or a data processing system. The electronic equipment is made up of circuit boards which consume power. A conventional power supply system includes a single power supply bus for each voltage to be distributed to all the circuit boards which consume power. A redundant power supply system is protected against failure of one power supply unit by virtue of redundancy of the power supply units constituting it: coupling devices are used to combine currents supplied by power supply units operating at the same voltage and to prevent reverse current flow in each power supply unit.

2. Description of the Prior Art

In conventional systems each power supply unit is protected against overloads by means of a current limiter which limits the output of the power supply unit to the maximal value that the power supply unit can withstand. There are two types of current limiter:

limiters which behave as current regulators as soon as the current reaches a predetermined maximal value; and tripping limiters which disconnect the circuit as soon as the circuit reaches a predetermined maximal value, even if this is merely a short-term current surge.

There are two types of tripping limiter:

limiters which are reset automatically, and limiters which have to be reset by an operator.

The former have a drawback where a plurality of power supply units are connected in parallel and the total current consumed by the loads is greater than the maximal current that a single power supply unit can supply: if the current limiters are not all reset at the same time, the current is not divided equally between all the current limiters. That which is reset first trips out first, and the others may then trip out in cascade.

The latter type of limiter has a different drawback: once the current limiter has disconnected the circuit, an operator is required to reset the current limiter.

The conventional way to avoid these drawbacks is to use in a redundant power supply system current limiters which regulate the current to a maximal value, instead of disconnecting the circuit. It is then necessary to provide heatsinks suited to the power dissipated in the current limiters when they are regulating the current to its maximal value. These heatsinks have the drawbacks of being costly and bulky.

An object of the invention is to enable the use of tripping limiters which are reset automatically in a redundant power supply system, to avoid the need to use costly and bulky heatsinks.

SUMMARY OF THE INVENTION

The invention consists in a synchronization device for a redundant power supply system supplying power to at least one load from a plurality of power supply units each including a tripping current limiter device which is reset automatically, which trips out when the current flowing through it is greater than a predetermined value, and which includes a coupling device for coupling at least two of the power supply units to each load, the synchronization device including a synchronization link interconnecting all the current limiters of all the power supply units and at least one generator supplying a synchronization signal and connected to the synchronization link, and each current limiter including synchronization means connected to the synchronization link and which reset the current limiter in response to receiving a synchronization signal transmitted on the synchronization link.

The above device starts without difficulty, whether on power up or on an automatic reset after a short-term current surge has ceased; this is because the synchronizing means reset each current limiter at the same time, which is defined by a synchronization signal distributed via the synchronization link.

In a first embodiment of the invention the synchronization means of each power supply unit include a generator for sending a synchronization signal periodically and independently for each current limiter and the generators all send in parallel on the synchronization link.

In another embodiment of the invention the device of the invention includes a single synchronization signal generator common to all the power supply units and having an output connected to the synchronization link to distribute the synchronization signal to all the current limiters.

The invention will be better understood and other features of the invention will emerge from the following description and from the accompanying drawings.

DETAILED DESCRIPTION OF THE PREFERRED EMBODIMENTS

Figure 1:
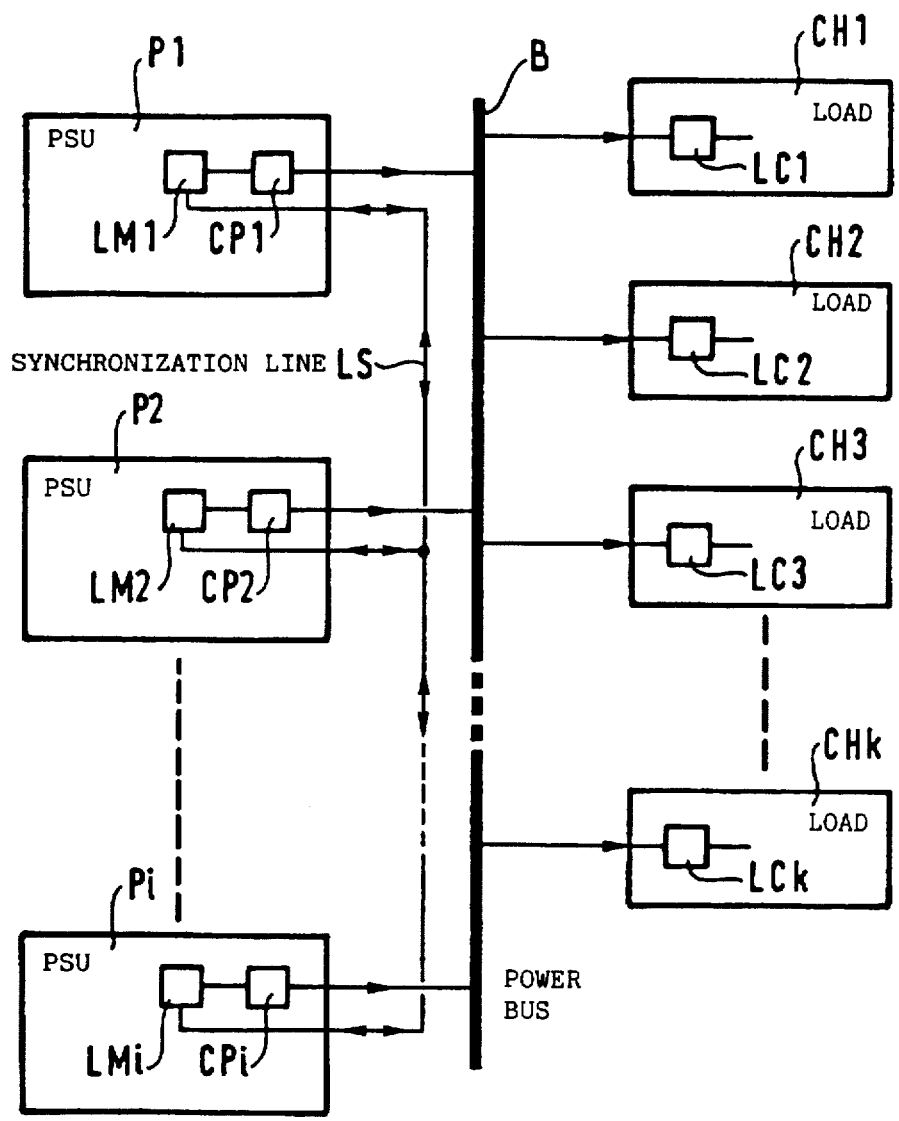
FIG. 1 is a block diagram of one example of a redundant power supply system incorporating one embodiment of a synchronization device of the invention.

The system shown in FIG. 1 feeds k loads in the form of electronic circuit boards CH1, CH2, CH3, . . . CHk. It includes a plurality of power supply units P1, . . . , Pi supplying the same voltage to all the boards via a power bus B. Each power supply unit P1, . . . , Pi includes a respective current limiter LM1, . . . , LMi and is connected in parallel with the like power supply units by a respective coupler CP1, . . . , CPi. The current limiters LM1, LM2, . . . , LMi each have an input-output connected to a synchronization line LS.

The current supplied by the power supply unit P1 flows first through the current limiter LM1 which limits the output current to the maximal value that the power supply unit P1 can supply. It then flows through the coupler CP1, an output of which is connected to the bus B. Likewise in the other power supply units. Each of the boards CH1, . . . , CHk includes a respective current limiter LC1, . . . , LCk which limits the current drawn by the board to a predetermined value based on the electronic components on the board and which is very much lower than the maximal current that any of the power supply units P1, . . . , Pi can supply.

In a conventional system the power supply units P1, ..., Pi are capable of supplying the same maximal current and the latter is equal to 1/(i−1) times the total current drawn by all the boards CH1, ..., CHk so that should any of the power supply units fail the remaining i−1 power supply units can take over. The coupling devices CP1, ..., CPi conventionally comprise a diode or an MOS transistor associated with a control circuit which turns off the transistor if the flow of current in the power supply unit tends to reverse.

The current limiters LM1, ..., LMi and the current limiters LC1, ..., LCk conventionally comprise a transistor, a low-value resistor and a control circuit. The output current flows through the transistor and the resistor, the latter being used to measure the output current. In the system of the invention the limiters LM1, ..., LMi are of the tripping type, to avoid the heat dissipation problem previously mentioned, and are reset automatically, so that there is no need for operator action.

A problem then arises on powering up or on an automatic reset after a short-term current surge has ended, since the current drawn by all the boards CH1, ..., CHk is generally greater than the maximal current that can be supplied by a single one of the power supply units P1, ..., Pi: if the current limiters LM1, ..., LMi are not all reset at the same time, the current is not divided equally between all the current limiters and that which starts first trips out, after which the others may trip out in cascade.

The device of the invention synchronizes the starting up of the current limiters by means of synchronization means incorporated in each current limiter LM1, ..., LMi and a synchronization line LS which interconnects all the current limiters LM1, ..., LMi of all the power supply units P1, ..., Pi.

Figure 2:
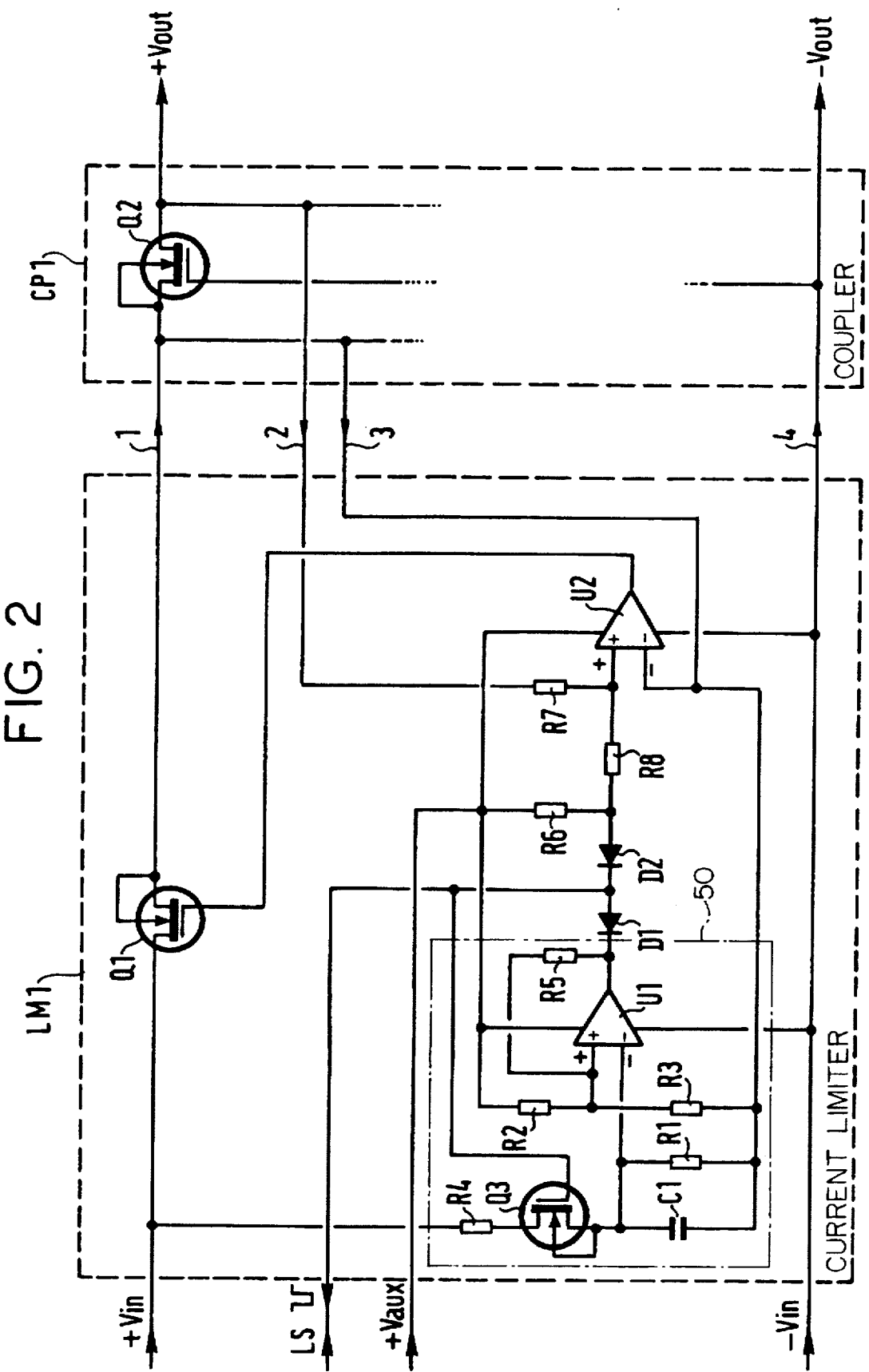
FIG. 2 is a block diagram of a first embodiment of the synchronization means of a power supply unit from the example shown in FIG. 1.

FIG. 2 shows the block diagram of a first embodiment of the current limiter LM1, for example. The block diagram of the coupler CP1 is shown in part. It includes an MOS transistor Q2 used as a coupling switch and as a resistor for measuring the output current. The implementation of the coupler CP1 will be evident to the person skilled in the art.

The limiter LM1 essentially includes:

an MOS transistor Q1 which is used as a switch; its internal resistance is very low when the current limiter is operating normally and is virtually infinite when the current limiter has tripped out;

an operational amplifier U2 and associated resistors R6, R7, R8 constituting a comparator which turns off the transistor Q1 if the output current exceeds a predetermined threshold value;

an operational amplifier U1, an MOS transistor Q3 and associated resistors R1, R2, R3, R4, R5 and an associated capacitor C1 constituting an astable multivibrator (i.e., a generator) 50; and two diodes D1, D2 coupling the multivibrator 50, the comparator and the synchronization line LS.

The transistors Q1, Q2, Q3 are of the N-channel depletion MOS type.

The current limiter LM1 further includes:

an input receiving a voltage +Vin and connected to the drain of Q1;

an input receiving an auxiliary voltage +Vaux, greater than the voltage +Vin;

an input receiving a voltage −Vin, a synchronization input connected to the synchronization line LS;

an input 2 and an input 3 respectively connected to the downstream side and to the upstream side of the transistor Q2 of the coupling device CP1 to measure the voltage drop between the drain and the source of this transistor; this voltage drop is representative of the output current;

an output 1 which supplies the voltage +Vin less a small voltage drop due to the transistor Q1; this output 1 is connected to the source of the transistor Q1; and an output 4 passing on the voltage −Vin without modification.

The source of Q2 is connected to the output 1. The drain of Q2 supplies a voltage +Vout equal to +Vin less the small voltage drops in the transistors Q1 and Q2. An input of the coupler CP1 is connected to the output 4 to receive the voltage −Vin. An output of the coupler CP1 applies to a ground line of the system a voltage −Vout equal to the voltage −Vin.

The drain of the transistor Q1 is connected to the input receiving the voltage +Vin. The source of the transistor Q1 is connected to the output 1. The gate of the transistor Q1 is connected to the output of the operational amplifier U2. The inverting input of the operational amplifier U2 is connected to the input 3. The non-inverting input of the operational amplifier U2 is connected to a common terminal of the resistors R7 and R8. The other terminal of the resistor R7 is connected to the input 2. The amplifier U2 receives the supply voltages +Vaux and −Vin. The resistors R6 and R8 have a common terminal connected to the anode of the diode D2. The other terminal of the resistor R6 is connected to the voltage +Vaux.

The operational amplifier U1 includes:

two power supply inputs respectively connected to the voltage +Vaux and to the voltage −Vin;

an output connected to the cathode of the diode D1 and to a first terminal of the resistor R5; the anode of the diode D1 is connected to the cathode of the diode D2, to the synchronization line LS and to the gate of the transistor Q3;

a non-inverting input connected to the second terminal of the resistor R5, to a first terminal of the resistor R2 and to a first terminal of the resistor R3; and an inverting input connected to the source of the transistor Q3, to a first terminal of the capacitor C1 and to a first terminal of the resistor R1.

The second terminal of the resistor R2 is connected to the voltage +Vaux. The second terminals of the capacitor C1, the resistor R1 and the resistor R3 are connected to the input 3 which receives the voltage sampled on the upstream side of the transistor Q2. The drain of the transistor Q3 is connected to the voltage +Vin via a resistor R4.

Under normal operating conditions, the transistor Q1 is turned on and produces a very small voltage drop. The diode D2 is turned off because a voltage equal to +Vin is present on the synchronization line LS. The operational amplifier U2 compares the voltage on the upstream side of the transistor Q2 and a voltage supplied by the resistor bridge R6, R8, R7, which supplies a voltage equal to the sum of a fraction of the voltage +Vout on the downstream side of the transistor Q2 and a fraction of the fixed voltage +Vaux. The values of the resistors R6, R7, R8 are such that when the maximal allowed current is reached the voltages applied to the non-inverting input and to the inverting input are equal. Beyond this maximal current the output of the amplifier U2 drops from a high level to an intermediate level causing a constant current to flow in the transistor Q1. The amplifier U2 biases the transistor Q1 so that the voltage drop produced by this current in Q2, via the bridge R6, R8, R7, produces at the non-inverting input of the amplifier U2 a voltage equal to that present at the inverting input.

The voltage across Q1 charges the capacitor C1 via the resistor R4 and the saturated resistor Q3. The charging time is determined by the time constant defined by R4, R1 and C1 and by the voltage across Q1. When the voltage across C1 reaches the voltage at the non-inverting input of the amplifier U1, the output of the latter drops suddenly from the intermediate level to a low level. The resistor R5 introduces some hysteresis which latches this change of state. The low level at the output of the amplifier 1 is then applied via the diode D2 to the non-inverting input of the amplifier U2, the output of which drops from the intermediate level to a low level which turns of the transistor Q1.

The low level at the output of the amplifier U1 is communicated to the other current limiters via the synchronization line LS. It turns off all the transistors which are counterparts of Q1, and so disconnects the entire power supply system. This low level also turns off the transistor Q3 because of the low level applied to its gate. The capacitor C1 then discharges via the resistor R1.

The amplifier U2 is disabled until a low level (near −Vout) is applied to the cathode of the diode D2. This low level can be applied either by the synchronization line LS or by the multivibrator 50 of the current limiter LCij, which outputs a low-level pulse periodically.

The capacitor C1 is discharged. At the end of a certain time the voltage it applies to the inverting input of the amplifier Q1 falls below the voltage it applies to the non-inverting input via the resistors R2, R3, R5. The output of the amplifier U1 then rises suddenly to the high level, and this change is applied to the synchronization line LS and to the gate of the transistor Q3, which is turned on.

When the common terminal of the diodes D3 and D4 goes to the low level, whether due to the action of the local multivibrator 50 or due to the action of another multivibrator 50 in another current limiter, the voltage applied to the non-inverting input of the amplifier U2 is forced, the effect of which is to change the state of the comparator consisting of the amplifier U2, and therefore to reset the current limiter.

When the synchronization line goes to the high state again, all the amplifiers which are counterparts of U2 are authorized to turn on the transistor Q1. If the overload is still present, the amplifier U2 again limits the current in Q1 and a new tripping/resetting cycle takes place. If the overload has disappeared, all the transistors which are counterparts of Q1 are turned on when the synchronization line goes high again and this simultaneous resetting restarts the entire system.

In the event of a short-term voltage surge, the current limiter in which the capacitor C1 reaches the decision threshold first commands the resetting of the others via the synchronization line LS. Accordingly, parameter spread of the components R1, R2, R3, R4, R5, C1, U1 has no effect on synchronizing resetting of all the current limiters.

Note that the synchronization line LS can be used for remote control of turning off of all the electronic circuit boards supplied with power by the power supply system, by imposing a low level on the synchronization line LS by any suitable means.

The output current can be measured by a conventional resistor instead of using the transistor Q2 of the coupling device.

Figure 3:
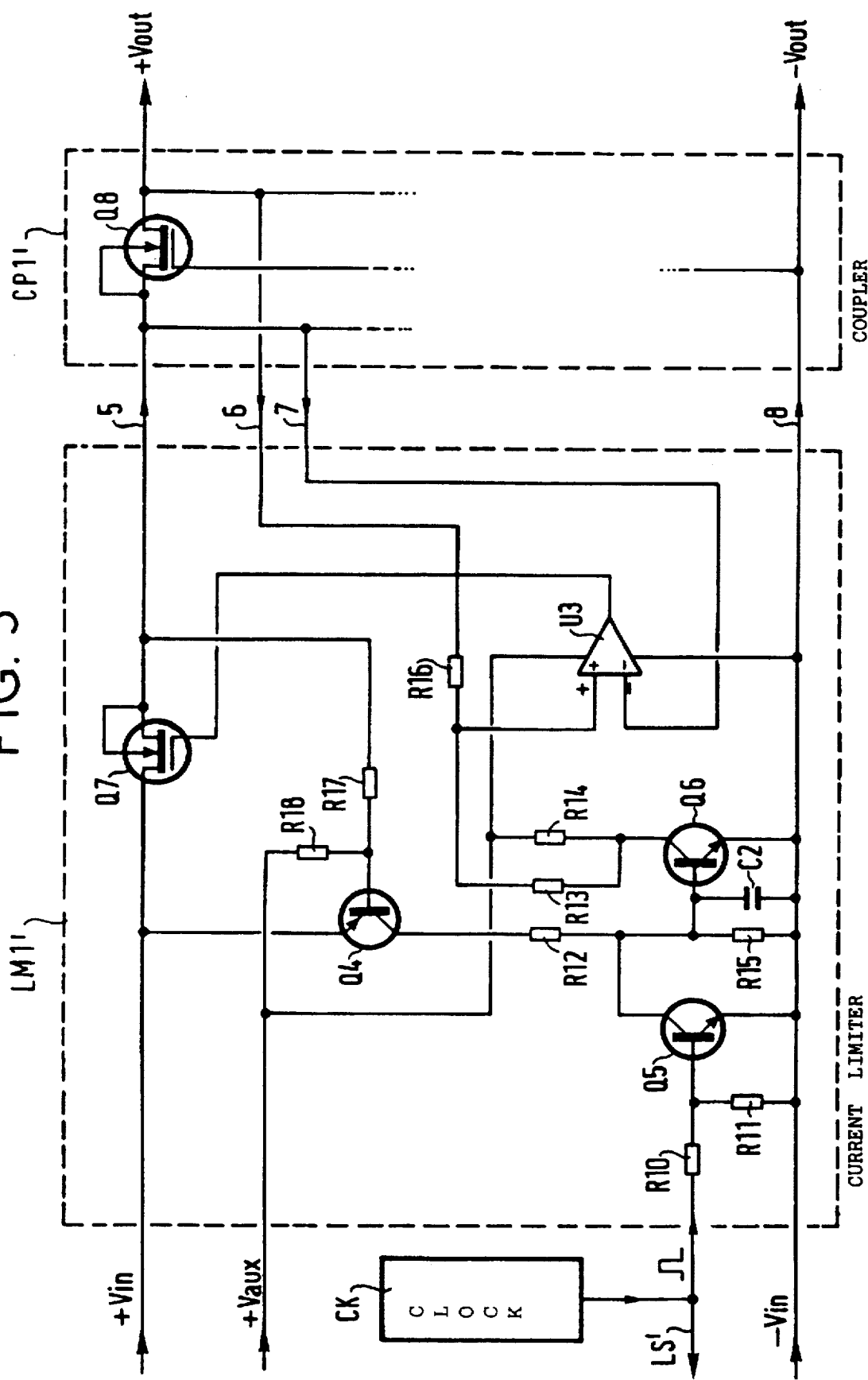
FIG. 3 is a block diagram of a second embodiment of the synchronizing means.

FIG. 3 shows a block diagram of a second embodiment LM1' of the current limiter of the power supply unit P1. In this second embodiment all the limiters are connected in parallel to a synchronization line LS' which is connected to a clock CK (i.e., only a single generator) periodically supplying a high-level pulse to enable simultaneous resetting of all the current limiters on starting up the system or after a short-term current surge as disappeared. FIG. 3 shows part of the associated coupling device CP1'. The latter includes an MOS transistor Q8 the internal resistance of which when turned on is used to measure the output current. The remainder of the coupling device CP1' is not shown as it is not relevant to the operation on the current limiter LM1'. Also, its implementation is evident to the person skilled in the art.

The current limiter LM1' essentially comprises:

- an MOS transistor Q7 used as a switch; its internal resistance is very low when the current limiter is operating normally and is practically infinite when the current limiter has tripped out;
- an operational amplifier U3 with two associated resistors R13 and R16 constituting a comparator controlling the transistor Q7 and turning it off when the output current exceeds a predetermined threshold value; and
- a bistable multivibrator comprising three bipolar transistors Q4, Q5, Q6 and resistors R12, R14, R15, R17, R18.

The limiter LM1' further includes:

- an input receiving a voltage +Vin;
- an input receiving an auxiliary voltage +Vaux;
- an input connected to a synchronization line to receive a synchronization clock signal;
- an input receiving a voltage −Vin;
- an output 5 supplying a voltage equal to +Vin less a small voltage drop produced by the transistor Q7;
- an output 8 transmitting the voltage −Vin without modification; and
- two inputs 6 and 7 respectively connected to the downstream side and to the upstream side of the transistor Q8 of the coupling device CP1' to measure a voltage representative of the output current.

The coupler CP1' produces a voltage +Vout equal to the voltage at the output 5 less a small voltage drop in the transistor Q8. It also produces a voltage −Vout equal to −Vin.

The transistors Q7 and Q8 are N-channel depletion MOS transistors. The transistor Q4 is a PNP bipolar transistor. The transistors Q5 and Q6 are NPN bipolar transistors.

The drain of the transistor Q7 is connected to the input receiving the voltage +Vin. Its source is connected to the output 5. Its gate is connected to the output of the operational amplifier U3. The amplifier U3 has two power supply inputs respectively connected to the input receiving the voltage +Vaux and to the input receiving the voltage −Vin. It further has an inverting input connected to the input 7 and a non-inverting input connected to a common terminal of the resistors R13 and R16; the second terminal of the resistor R16 is connected to the input 6. The second terminal of the resistor R13 is connected to the collector of transistor Q6. The emitter of the transistor Q6 is connected to the input receiving the voltage −Vin. Its collector is connected to the voltage +Vaux by a resistor R14.

Under normal operating conditions the transistor Q6 is saturated, in the absence of any synchronization signal, and consequently its collector is at a voltage −Vin. The resistors R13 and R16 constitute a divider bridge which applies to the non-inverting input of the amplifier U3 a fraction of the voltage sampled on the downstream side of the transistor Q8. The inverting input of the amplifier U3 receives the voltage sampled on the upstream side of the transistor Q8. The values of the resistors R13 and R16 are such that when the output current reaches the maximal allowed value the voltage at the common terminal of R13 and R16 is equal to the voltage on the upstream side of the transistor Q8.

Accordingly, if the output current exceeds the maximal allowed value the output of the amplifier U3 drops from a high level to an intermediate level assuring a constant current in the transistor Q7. The amplifier U3 biases the transistor Q7 in such manner that, via the bridge R16, R13, R14, the voltage drop produced by this current in Q8 produces at the non-inverting input of the amplifier U3 a voltage equal to that at the inverting input. The transistor Q4 is turned on if the voltage drop across Q7 exceeds the threshold created by the conduction threshold of the emitter-base junction of Q4 and the resistors R17 and R18.

This condition is latched by the bistable multivibrator comprising transistors Q4 and Q6. The emitter of the transistor Q4 is connected to the input connected to the voltage +Vin. Its collector is connected to a first terminal of a resistor R12. Its base is connected to a common point of the resistor R17 and R18. The second terminals of the resistors R17 and R18 are respectively connected to the source of the transistor Q7 and to the input receiving the voltage +Vaux. The second terminal of the resistor R12 is connected to the base of the transistor Q6 and to a first terminal of the resistor R15. The second terminal of the resistor R15 is connected to the input receiving the voltage −Vin. The collector of the transistor Q6 is connected to the second terminal of the resistor R13 already mentioned and to a terminal of the resistor R14. The second terminal of the resistor R14 is connected to the voltage +Vaux.

Under normal operating conditions the transistor Q4 is turned off. When the current limiter trips out the voltage on the downstream side of the transistor Q7 drops to a value −Vin. Consequently, the resistor R17 turns on the transistor Q4. The current flowing through Q4 then turns on the transistor Q6. As the collector voltage of the transistor Q6 falls, the voltage applied to the inverting input of the amplifier U3 via the bridge R13, R16 falls and latches the state of the amplifier U3. The latter supplies a low level which turns off the transistor Q7 until the system is reset.

A capacitor C2 between the base of the transistor Q6 and the input receiving the voltage −Vin prevents the bistable multivibrator changing state and confirms turning off of the transistor Q7 in response to a very short duration current surge which is of no consequence.

The current limiter LM1' is reset by the transistor Q5 the collector of which is connected to the base of the transistor Q6 and the emitter of which is connected to the input receiving the voltage −Vin. Its base is connected to the input receiving the synchronization signal via a resistor R10 and to the input receiving a voltage −Vin via the resistor R11. The synchronization signal comprises periodic pulses at a high level near +Vin which turn on the transistor Q5 to divert the current supplied by the transistor Q4. The transistor Q6 is turned off when the voltage supplied by the bridge R13, R14, R16 returns to a voltage greater than the voltage −Vin applied to the inverting input. Accordingly, the amplifier U3 changes state. Its output supplies a high level which turns on the transistor Q7. At the end of the synchronization signal pulse the transistor Q7 remains turned on if the current surge has ended.

The scope of the invention is not limited to the situation in which each power supply unit comprises only one current limiter. It applies likewise to all cases in which the same load is supplied with power via at least two current limiters connected in parallel where the current limiters are of the tripping type with automatic reset.

There is claimed:

1. In a redundant power supply system supplying power to a load from a plurality of power supply units each of which includes a corresponding one of a plurality of tripping current limiter devices which is reset automatically and which trips out when current flowing therethrough is greater than a predetermined value, a synchronization device comprising:

a coupling device coupling said plurality of power supply units to said load;

a synchronization link interconnecting said plurality of tripping current limiter devices;

each of said plurality of tripping current limiter devices including a corresponding one of a plurality of synchronization means for resetting, in response to a synchronization signal, said each tripping current limiter device;

a plurality of generators, each of said plurality of generators being included in a corresponding one of said plurality of synchronization means, each of said plurality of generators being operable so as periodically to provide, on said synchronization link, in response to said tripping out, said synchronization signal to all said plurality of tripping current limiter devices in parallel at the same time.

2. In a redundant power supply system supplying power to a load from a plurality of power supply units each of which includes a corresponding one of a plurality of tripping current limiter devices which is reset automatically and which trips out when current flowing therethrough is greater than a predetermined value, a synchronization device comprising:

a coupling device coupling said plurality of power supply units to said load, a synchronization link interconnecting said plurality of tripping current limiter devices, and means for providing a synchronization signal on said synchronization link comprising only a single synchronization signal generator;

wherein each of said plurality of tripping current limiter devices includes a corresponding one of a plurality of synchronization means for resetting, in response to said synchronization signal, said each tripping current limiter device; and wherein said only a single synchronization signal generator is operable so as periodically to provide, on said synchronization link, said synchronization signal to all of said plurality of tripping current limiter devices at the same time.

3. The synchronization device as set forth in claim 2, wherein said only a single synchronization signal generator is a clock.

* * * * *